(12) United States Patent
Saias et al.

(10) Patent No.: US 11,524,778 B2
(45) Date of Patent: Dec. 13, 2022

(54) VTOL AIRCRAFT

(71) Applicant: ROLLS-ROYCE plc, London (GB)

(72) Inventors: Chana A Saias, Bedford (GB); Vasileios Pachidis, Milton Keynes (GB)

(73) Assignee: ROLLS-ROYCE plc, London (GB)

( * ) Notice: Subject to any disclaimer, the term of this patent is extended or adjusted under 35 U.S.C. 154(b) by 193 days.

(21) Appl. No.: 17/080,145

(22) Filed: Oct. 26, 2020

(65) Prior Publication Data

US 2021/0122465 A1  Apr. 29, 2021

(30) Foreign Application Priority Data

Oct. 24, 2019 (GR) .............................. 20190100477

(51) Int. Cl.
*B64C 29/00* (2006.01)
*B64C 39/08* (2006.01)
*B64D 27/24* (2006.01)
*B64D 27/02* (2006.01)

(52) U.S. Cl.
CPC .......... *B64C 29/0033* (2013.01); *B64C 39/08* (2013.01); *B64D 27/24* (2013.01); *B64D 2027/026* (2013.01)

(58) Field of Classification Search
CPC . B64C 29/0033; B64C 39/08; B64C 29/0016; B64C 29/0008; B64D 2027/026
See application file for complete search history.

(56) References Cited

U.S. PATENT DOCUMENTS

| 3,246,861 A * | 4/1966 | Curci .................. B64C 29/0033 |
| | | 244/17.23 |
| 2004/0232280 A1 | 11/2004 | Carter et al. |
| 2010/0001120 A1 | 1/2010 | Sun |

(Continued)

FOREIGN PATENT DOCUMENTS

| CN | 109263932 A * | 1/2019 | ............. B64C 27/28 |
| CN | 110182361 A * | 8/2019 | |

(Continued)

OTHER PUBLICATIONS

Jul. 29, 2020 British Search Report issued in International Patent Application No. 1917986.0.

(Continued)

*Primary Examiner* — Timothy D Collins
*Assistant Examiner* — Justin Michael Heston
(74) *Attorney, Agent, or Firm* — Oliff PLC

(57) ABSTRACT

A VTOL aircraft has fixed wings and a rotor blade system for providing lift in active and passive modes thereof. Operation of the rotor blade system may be switched between the active mode in which the rotor blade system is driven by a power system of the aircraft and the passive mode in which the rotor blade system is not driven by the power system, the rotor blade system being configurable to provide lift in the passive mode during forward flight of the aircraft. The rotor blade system provides lift in the passive mode, allowing the fixed wings to be shorter than in the case where the rotor system provides lift during vertical take-off and landing but otherwise has no function, thus providing aircraft which is lighter, more compact and more efficient than similar aircraft of the prior art.

16 Claims, 6 Drawing Sheets

(56) References Cited

U.S. PATENT DOCUMENTS

| | | | |
|---|---|---|---|
| 2012/0119016 A1 | 5/2012 | Shaw | |
| 2012/0261523 A1* | 10/2012 | Shaw | ................ B64C 27/28 |
| | | | 244/7 R |
| 2016/0052626 A1 | 2/2016 | Vander Mey | |
| 2018/0065739 A1* | 3/2018 | Vondrell | ................ B64D 27/24 |
| 2019/0100303 A1* | 4/2019 | Campbell | ................ B64C 27/26 |
| 2019/0112039 A1* | 4/2019 | Pfaller | ................ B64C 27/20 |

FOREIGN PATENT DOCUMENTS

| | | | |
|---|---|---|---|
| EP | 2690012 A1 * | 1/2014 | ............. B64C 27/26 |
| EP | 3 098 161 A1 | 11/2016 | |
| EP | 3 290 334 A1 | 3/2018 | |
| EP | 3290334 A1 * | 3/2018 | ........... B64C 11/001 |
| WO | WO-2015089679 A1 * | 6/2015 | ............. B64C 27/16 |
| WO | WO-2016016889 A1 * | 2/2016 | ............. B64C 27/28 |

OTHER PUBLICATIONS

Mar. 16, 2021 Extended European Search Report issued in European Patent Application No. 20201247.2.

* cited by examiner

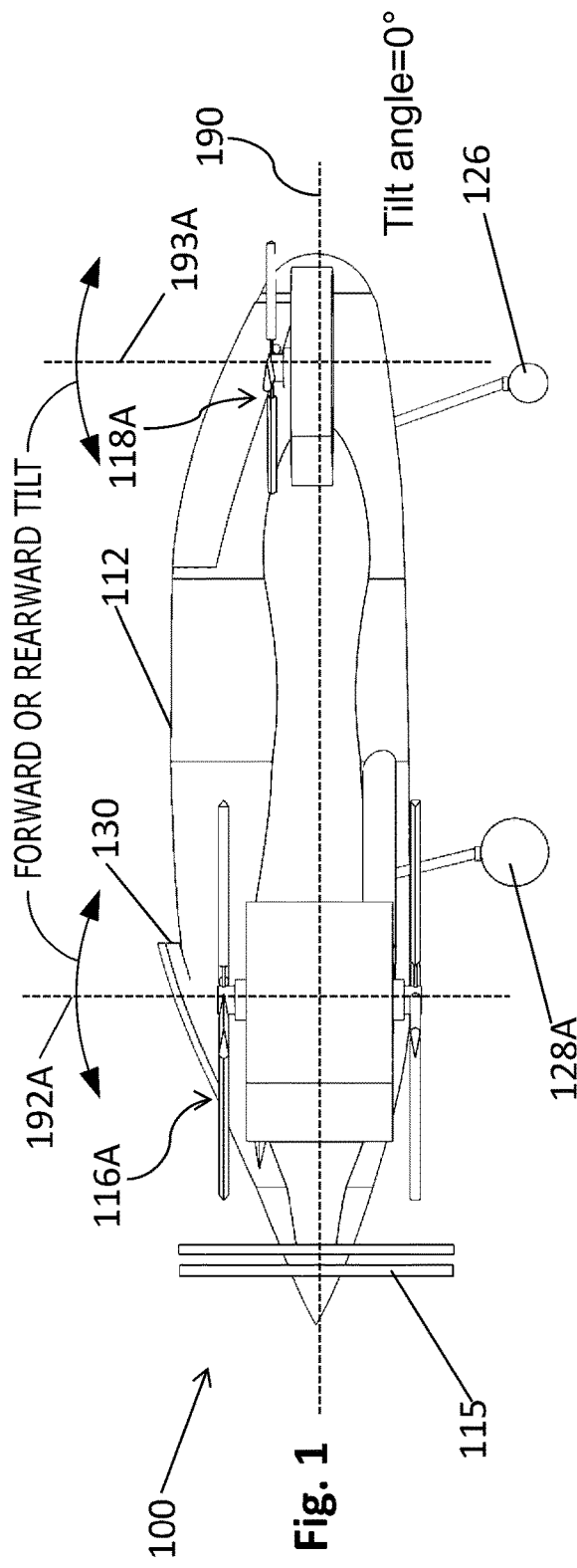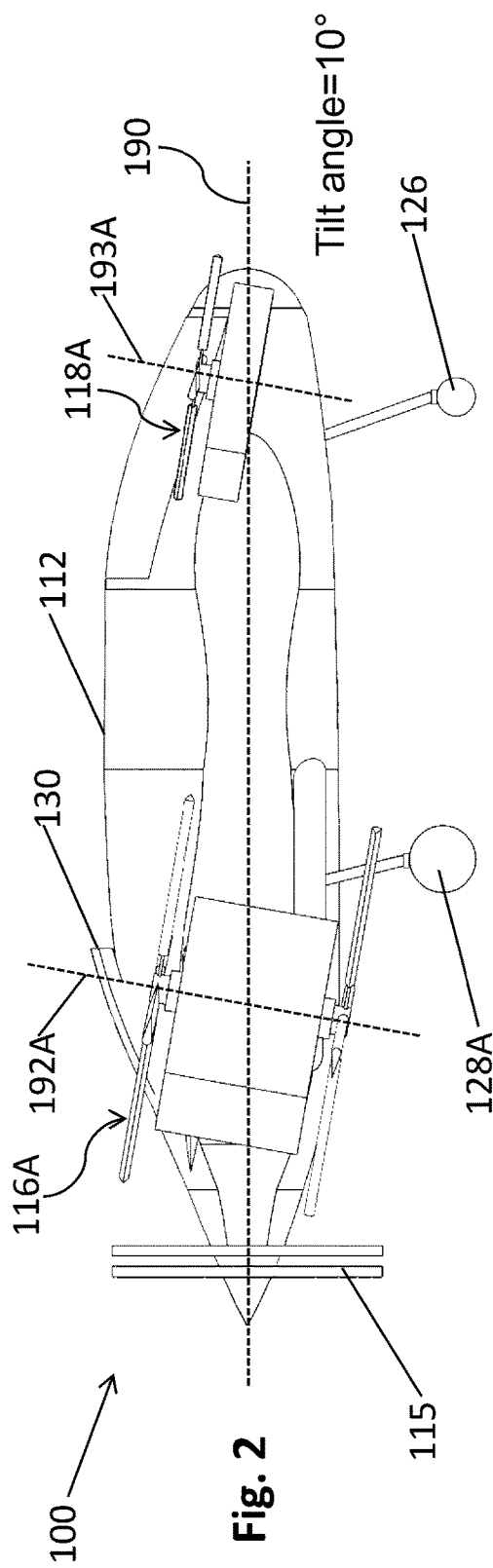

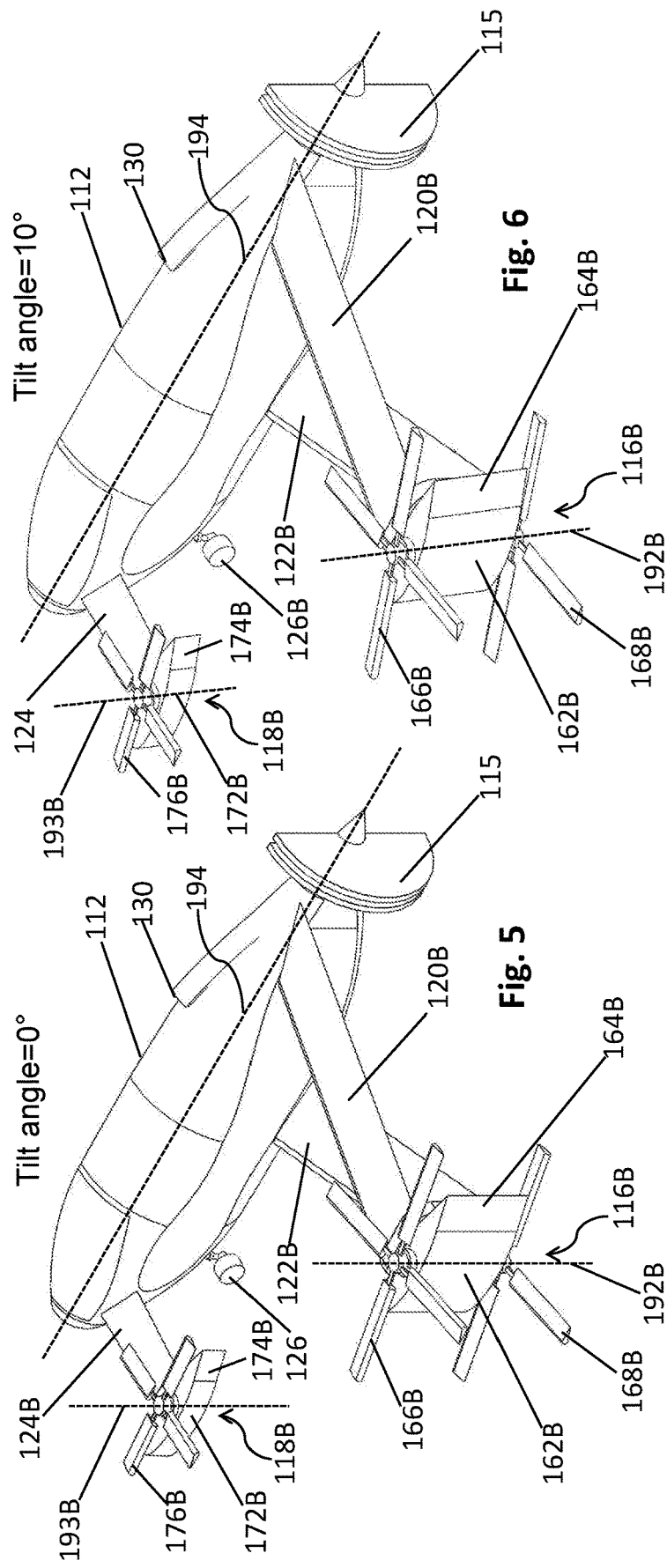

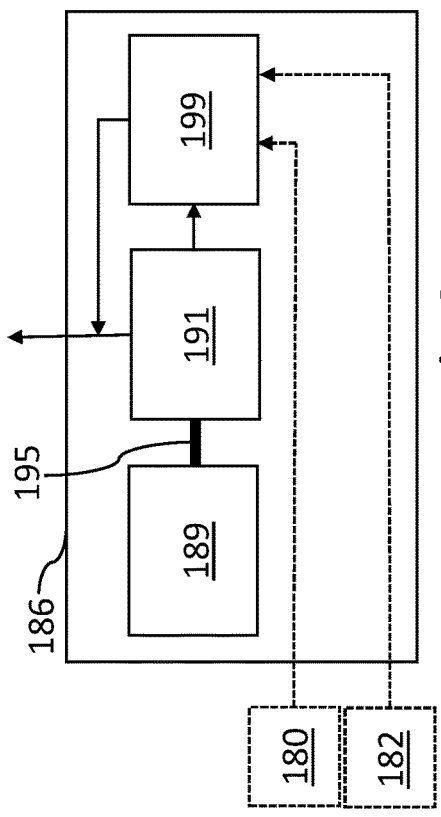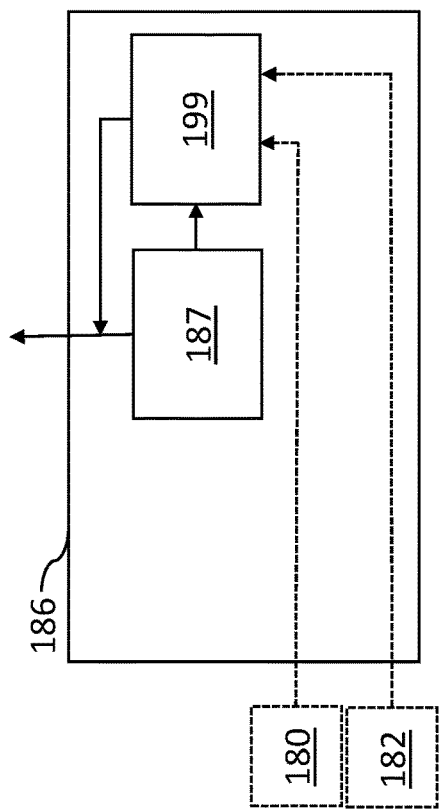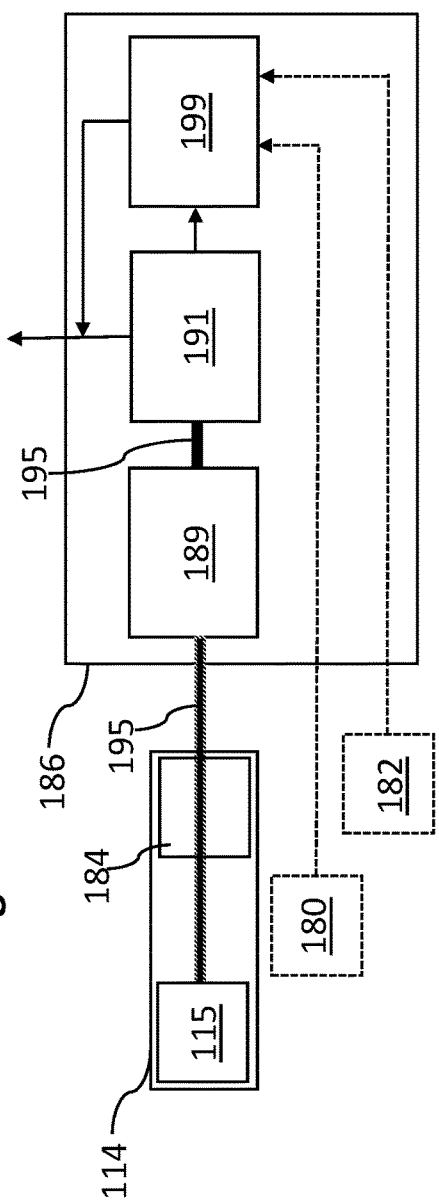

VTOL AIRCRAFT

TECHNICAL FIELD

Examples of VTOL aircraft are described. A VTOL aircraft is an aircraft having vertical take-off and landing (VTOL) functionality.

BACKGROUND

VTOL aircraft are known as such. A helicopter is one example. Another example is an aircraft, such as the Kitty Hawk® Cora® or the Boeing® Passenger Air Vehicle (PAV), which has fixed wings for providing lift in forward flight, propulsors for providing lift during take-off, landing and hovering, and a propulsor for providing forward thrust. In the case of a helicopter, the rotor of the helicopter must be driven continuously during forward flight because there is no other means of providing lift. In the case of an aircraft such as the Cora or PAV, the propulsors providing lift are switched off during forward flight since the fixed wings provide lift once the aircraft has sufficient air speed. However, once these propulsors are switched off they provide no useful function and are sources of weight and drag, reducing the efficiency of the aircraft in forward flight. In order for the fixed wings to provide sufficient lift in forward flight, their length can be considerable which may be inconvenient on the ground and may result in an undesirable contribution to the overall weight of the aircraft.

BRIEF SUMMARY

According to an example, a VTOL aircraft comprises a pair of fixed wings each wing being located on a respective lateral side of the aircraft, a propeller for providing forward thrust when driven by a power system of the aircraft and rotor blade system for providing lift in active and passive modes thereof, the rotor blade system comprising first and second sets of rotor blades, each of which is mounted by a respective fixed wing, wherein operation of the rotor blade system may be switched between the active mode in which the rotor blade system is driven by a power system of the aircraft and the passive mode in which the rotor blade system is not driven by the power system of the aircraft, the rotor blade system being configurable to provide lift in the passive mode during forward flight of the aircraft.

Since the rotor blade system provides lift in forward flight, the fixed wings may be shorter than in the case of a similar aircraft in which the rotor blade system is inoperative in forward flight, thus providing a lighter and more compact aircraft. The aircraft also provides an improvement in efficiency compared to aircraft such as the Cora or PAV since the rotor blade system in the passive mode produces lower drag compared to a similar aircraft in which a rotor blade system for providing lift during take-off and landing is static in forward flight.

In order to provide a convenient scheme whereby the rotor blade system is configurable to provide lift in the active and passive modes thereof, the first and second sets of rotor blades may be comprised in first and second rotor units respectively, each rotor unit being rotatably mounted to a respective fixed wing of the aircraft such that the rotation axis of any given set of the first and second sets of rotor blades may be rotated in a plane which is orthogonal to the horizontal plane of the aircraft and parallel to the central longitudinal axis of the aircraft between a first orientation in which the rotation axis of the set is substantially normal to the horizontal plane of the aircraft and the rotor blade system is in the active mode thereof and a second orientation in which the rotation axis of the set is inclined to the horizontal plane of the aircraft and the rotor blade system is in the passive mode thereof.

Preferably the first and second rotor units each comprise a respective rudder for influencing the yaw of the aircraft.

Each of the first and second sets of rotor blades may comprise respective first and second sub-sets of rotor blades, the sub-sets of a given set being arranged for rotation about a common rotation axis and mutually displaced along said axis.

The aircraft may further comprise a second pair of fixed wings each of which is located on a respective lateral side of the aircraft, the second pair of fixed wings being located forward of the first pair of fixed wings.

The rotor blade system may further comprise third and fourth sets of rotor blades, each of which is mounted by a respective fixed wing of the second pair of fixed wings.

The third and fourth sets of rotor blades may be comprised in third and fourth rotor units respectively, each of the third and fourth rotor units being mounted to a respective fixed wing of the second pair of fixed wings such that the rotation axis of any given set of the third and fourth sets of rotor blades may be rotated in a plane which is orthogonal to the horizontal plane of the aircraft and parallel to the central longitudinal axis of the aircraft between a first orientation in which the rotation axis of the set is substantially normal to the horizontal plane of the aircraft and the rotor blade system is in the active mode thereof and a second orientation in which the rotation axis of the set is inclined to the horizontal plane of the aircraft and the rotor blade system is in the passive mode thereof.

Preferably the third and fourth rotor units each comprise a respective rudder for influencing the yaw of the aircraft.

At least part of the rotor blade system may be arranged to drive an electrical generator or an electrical machine configured as an electrical generator during the passive mode of operation of the rotor blade system, for example for use in charging a battery.

The power system may comprise an electric motor, or an electrical machine configurable as an electric motor, and an electrical power source, the electric motor or as the case may be the electrical machine configured an electric motor being arranged to receive electrical power from the electrical power source and to drive at least part of the rotor blade system.

The electrical power source may be an electrical power generator or an electrical energy store.

The electrical power source may comprise an electrical power generator and an electrical energy store, the power system being configurable such that (i) the electric motor or as the case may be the electrical machine configured as an electric motor may receive electrical power from the electrical power generator or the electrical energy store or both the electrical power generator and the electrical energy store, and (ii) the electrical energy store receives electrical power from the electrical power generator.

The power system may comprise an electric motor arranged to receive electrical power from the electrical power generator, the electrical energy store or both the electrical power generator and the electrical energy store, and to provide mechanical power to the propeller.

The electrical power source may comprise an electrical generator and a gas turbine engine arranged to drive the electrical generator. In this case optionally a shaft of the gas turbine engine may be mechanically coupled to or integral with a shaft of the electric motor which is arranged to provide mechanical power to the propeller, so that the propeller may be driven by the gas turbine engine and/or said motor.

The electric motor or as the case may be the electrical machine configured as an electric motor may be an electrical machine which is configurable in the passive mode as an electrical generator which is arranged to provide electrical power to the electrical energy store.

BRIEF DESCRIPTION OF THE DRAWINGS

Examples are described below by way of example only, with reference to the figures in which:

FIGS. 1 & 2 show side elevations of an example aircraft of the invention;

FIGS. 5 & 6 show perspective views of the aircraft of FIGS. 1 to 4;

FIGS. 8, 9 & 10 each show a respective alternative arrangement for an electrical power source comprised in the FIG. 7 arrangement.

DETAILED DESCRIPTION

Figure 3:
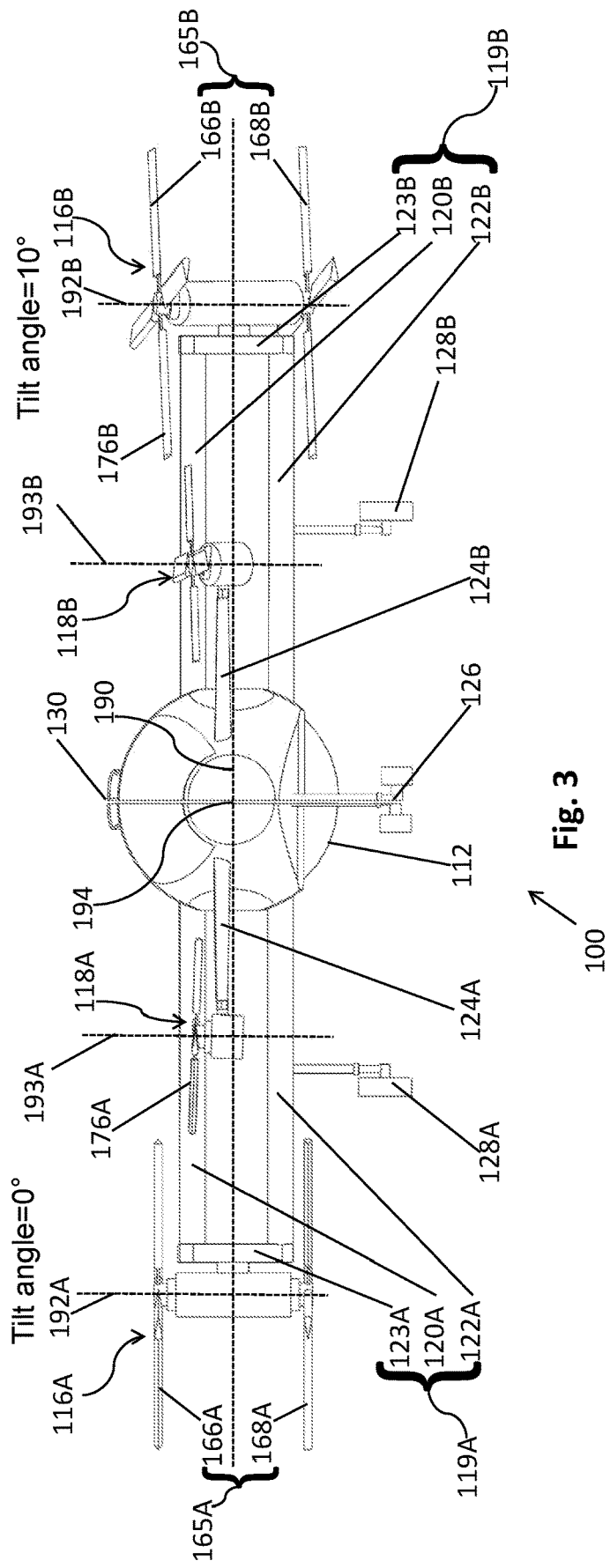
FIG. 3 shows a front elevation of the aircraft of FIGS. 1 & 2.

Referring generally to FIGS. 1 to 7, a first example aircraft 100 comprises a fuselage 112, right and left fore wings 124A, 124B and right and left aft wings 119A, 119B. The right aft wing 119A is a box-wing comprising forward- and rearward-swept wing segments 120A, 122A attached towards the top and bottom of the fuselage 112 respectively and a coupling element 123A located at the ends of the wing segments 120A, 120B remote from the fuselage 112. Similarly, the left aft wing 119B is a box-wing comprising forward- and rearward-swept wing segments 120B, 122B attached towards the top and bottom of the fuselage 112 respectively and a coupling element 123B. A propulsor unit 114 for providing forward thrust comprises a dual contra-rotating pusher propeller 115 located at the tail portion of the fuselage 112 and a motor 184 for driving the propeller 115. The aircraft 100 has a two-wheel nose landing gear 126 and a dual rear undercarriage having right and left units 128A, 128B. An intake 130 located at the top of the fuselage 112 provides an air flow to a portion of a power system 179 of the aircraft 100. The aircraft 100 has a horizontal plane 190 and a central longitudinal axis 194 (both fixed in the frame of the aircraft 100).

The aircraft 100 comprises a rotor blade system for providing vertical lift, the rotor blade system having first, second, third and fourth sets 165A, 165B, 176A, 176B of rotor blades comprised in first, second, third and fourth rotor units 116A, 116B, 118A, 118B respectively. The first and second rotor units 116A, 116B are attached to coupling elements 123A, 123B respectively of the right and left aft wings 119A, 119B and comprise the first and second sets 165A, 165B of rotor blades respectively. The third and fourth rotor units 118A, 118B are attached at the ends of the right and left fore wings 124A, 124B respectively, remote from the fuselage 112, and comprise the third and fourth sets 176A and 176B of rotor blades respectively. The first 165A and second 165B sets of rotor blades each comprise respective first 166A, 168A and second 166B, 168B sub-sets of rotor blades.

Referring specifically to FIGS. 5 and 6, the second rotor unit 116B comprises first and second sub-sets 166B, 168B of rotor blades arranged for rotation about a common axis 192B, an aerodynamic fairing 162B and a rudder 164B for influencing the yaw of the aircraft 100 in forward flight of the aircraft 100. The first and second sub-sets 166B, 168B of rotor blades are mutually displaced along the axis 192B. The second rotor unit 116B is rotatably mounted to coupling element 123B of left aft wing 119B such that the axis 192B may be rotated in a plane which is orthogonal to the horizontal plane 190 of the aircraft 100 and parallel to its central longitudinal axis 194. FIG. 5 shows the second rotor unit 116B in an upright position with axis 192B normal to the horizontal plane 190 of the aircraft 100. FIG. 6 shows the second rotor unit 116B in a tilted position with axis 192B inclined at about 80° to the aircraft horizontal plane 190 such that the first (upper) sub-set 166B of rotor blades is slightly forward of the second (lower) sub-set 168B of rotor blades. The first rotor unit 116A has similar structure and function to that of the second rotor unit 116B and is rotatably mounted to the right aft wing 116A in a manner like to that in which the second rotor unit 116B is attached to the left aft wing 116B. The first rotor unit 116A comprises the first set 165A of rotor blades, the first set 165A being made up of first 166A and second 168A sub-sets of rotor blades mutually displaced along a common rotation axis 192A.

Figure 4:
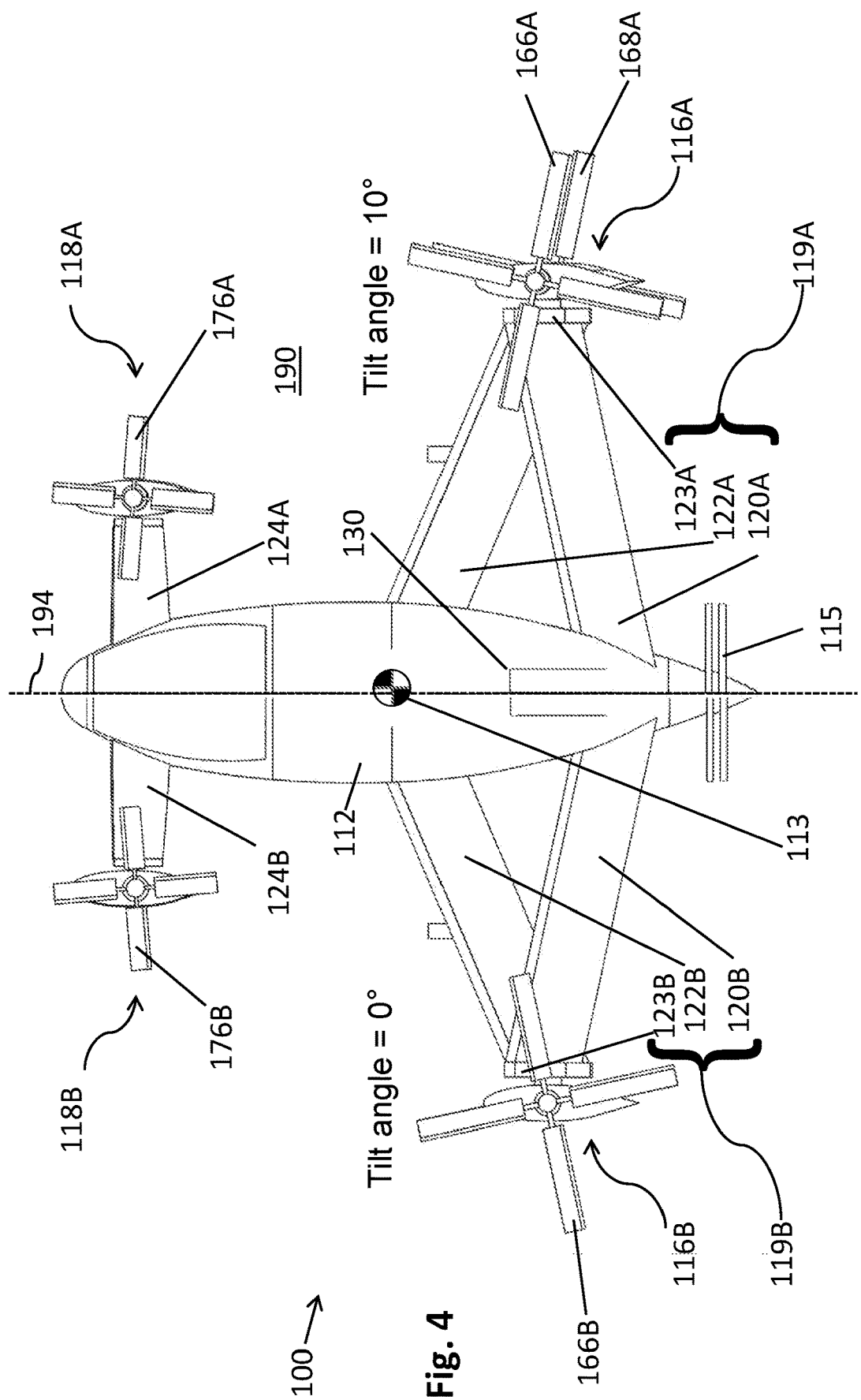
FIG. 4 shows a plan view of the aircraft of FIGS. 1 to 3.

The fourth rotor unit 118B comprises the fourth set 176B of rotor blades arranged for rotation about an axis 193B, an aerodynamic fairing 172B and a rudder 174B for influencing the yaw of the aircraft 100 in forward flight. The fourth rotor unit 118B is rotatably mounted to left fore wing 124B such that the axis 193B may be rotated in a plane which is orthogonal to the horizontal plane 190 of the aircraft 100 and parallel to its central longitudinal axis 194. FIG. 5 shows the fourth rotor unit 118B in an upright position with axis 193B normal to the horizontal plane 190 of the aircraft 100. FIG. 6 shows the fourth rotor unit 118B in a tilted position with axis 193B inclined at about 80° to the horizontal plane 190 of the aircraft 100 such that the fourth set 176B of rotor blades is slightly forward of the position it occupies when the fourth rotor unit 118B is in the upright position, as shown in FIG. 5. The third rotor unit 118A comprises the third set 176A of rotor blades, has a similar structure and function to that of the fourth rotor unit 118B and is rotatably mounted to right fore wing 124A in a manner like to that in which the third rotor unit 118B is attached to the left fore wing 124B. FIGS. 1 and 2 show the aircraft 100 with the first and third rotor units 116A, 118A in the upright and tilted positions respectively. In FIG. 3, the first and third rotor units 116A, 118A are each shown in the upright position and the second and fourth rotor units 116B, 118B are each shown in the tilted position. In FIG. 4, the fourth rotor unit 118B is shown in the upright position and third rotor unit 118A is shown in the tilted position. It will be understood that the rotors can be tilted to a forward (negative angle of attack) position as shown in the drawings, in order to passively rotate to generate sufficient rotational speed for an auto-rotation landing in the event of an electric motor failure. On the other hand, the rotors can be tilted to a rearward (positive angle of attack) position (not shown in the drawings) in order to generate lift during normal cruise flight.

The centre of gravity 113 of the aircraft 100 is located close to the roots of the aft wings 119A, 119B for increased stability and controllability, particularly in the case of failure of one or more the rotor units 116A, 116B, 118A, 118B.

Figure 7:
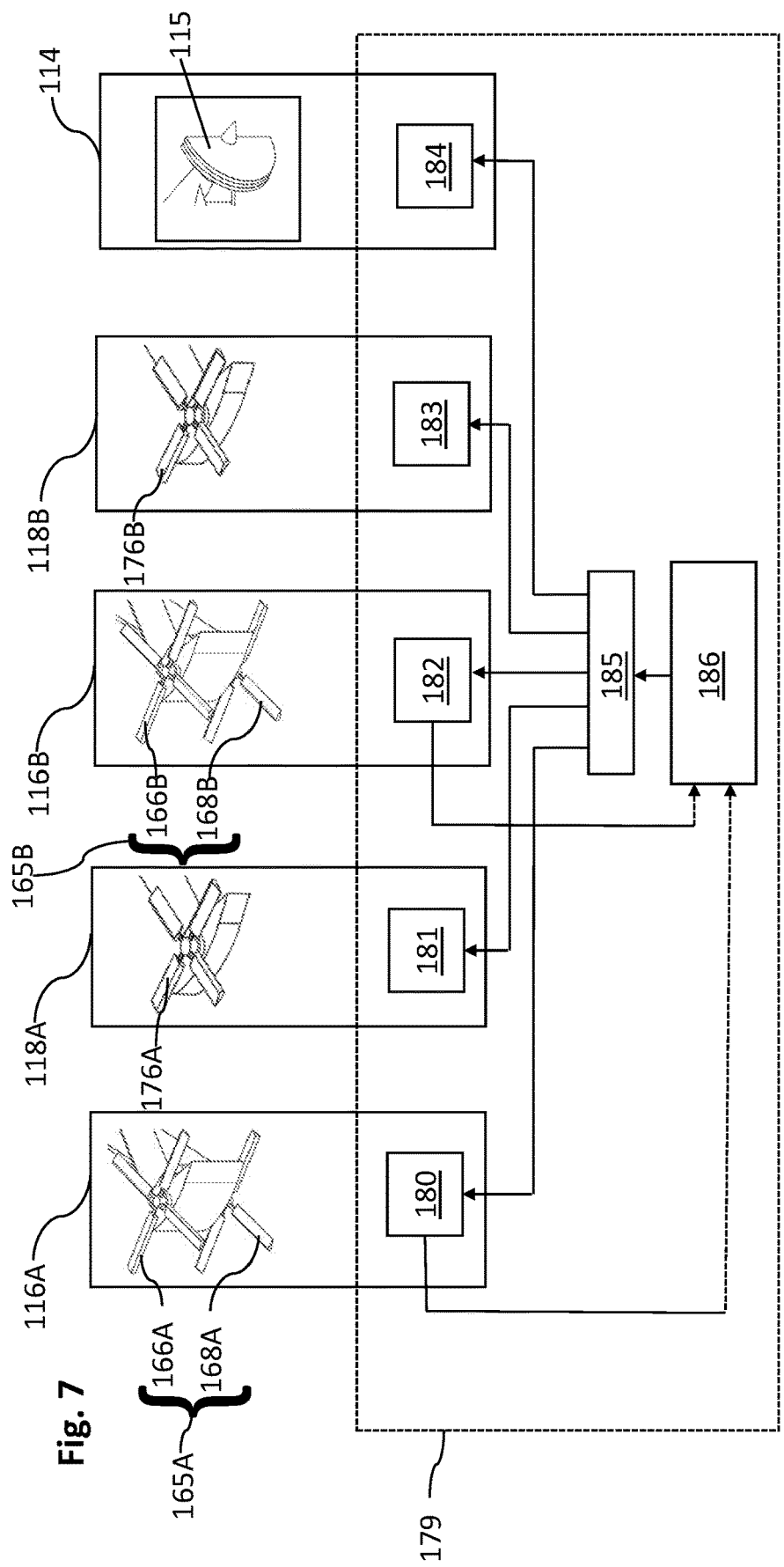
FIG. 7 shows an example arrangement for powering the aircraft of FIGS. 1 to 6.

FIG. 7 schematically shows the power system 179 for delivery of mechanical power to the dual contra-rotating pusher propeller 115 and the first to fourth sets 165A, 165B, 176A, 176B of rotor blades of the rotor blade system. The first and second rotor units 116A, 116B comprise electrical machines 180, 182 respectively which are configurable as motors or electric generators depending on the aircraft's mode of operation and either drive, or are driven by, the first and second sets 165A, 165B of rotor blades respectively, depending on the aircraft's mode of operation. The third and fourth rotor units 118A, 118B comprise electric motors 181, 183 respectively arranged to drive the third 118A and fourth 118B sets of rotor blades respectively. The propulsor unit 114 comprises an electric motor 184 arranged to drive the dual contra-rotating pusher propeller 115.

Electrical power drawn from an electrical power source 186, in this case an electrical energy store (e.g. a battery), is provided to the electric motor 184 via a controller 185 such that the forward thrust provided by the dual contra-rotating pusher propeller 115 may be varied. In an active mode of operation of the rotor blade system, the first to fourth sets of rotor blades 165A, 165B, 176A, 176B are in their upright positions (as shown in FIG. 1 for example), and electrical power drawn from the electrical energy store 186 is provided to the electric motors 181, 183 and electrical machines 180, 182 configured as electric motors via the controller 185 such that the lift provided by the rotor blade system 165A, 165B, 176A, 176B may be varied. In a passive mode of operation of the rotor blade system, the first to fourth sets of rotor blades 165A, 165B, 176A, 176B are not actively driven, but rotate passively in forward flight of the aircraft 100 in their titled positions (as shown in FIG. 2 for example). In the passive mode, machines 180, 182 may be configured as electrical generators to provide electrical power to the electrical energy store 186.

The aircraft 100 may generally operate, or be operated, as follows. During vertical take-off, the rotor blade system 165A, 165B, 176A, 176B is operated in an active mode in which electrical power is provided to electric motors 181, 183 and electrical machines 180, 182 configured as electric motors, with the rotor units 116A, 116B, 118A, 118B in their upright positions. The rotor blade arrangement is thus actively driven. Little or no electrical power is provided to motor 184 such that the dual contra-rotating propeller 115 produces little or no forward thrust. The rotor blade arrangement 165A, 165B, 176A, 176B thus provides lift for vertical take-off. After vertical take-off, power is provided to the motor 184 so that the propeller 115 provides forward thrust. Once the aircraft 100 has reached sufficient forward air speed, the rotor units 116A, 116B, 118A, 118B are moved to their tilted positions by means of actuators (not shown) comprised in the aircraft 100 and supply of electrical power to motors 181, 183 and machines 180, 182 (configured as motors) ceases. The first to fourth sets of rotor blades 165A, 165B, 176A, 176B then rotate passively, i.e. they continue rotate in a passive mode of operation due to the forward motion of the aircraft 100 but are not actively driven. The rotor blade system, consisting of the first to fourth sets of rotors blades 116A, 116B, 118A, 118B, provides lift in the passive mode by the autogyro principle.

When the rotor blade system is in the passive mode, electrical machines 180, 182, which are general electrical machines configured as electric motors in the active mode of the rotor arrangement 165A, 165B, 176A, 176B, maybe re-configured to operate as electrical generators in order to provide electrical energy to the electrical energy store 186. For example, when it is desired to reduce the altitude of the aircraft 100 in preparation for landing, the machines 180, 182 may be operated as electrical generators, charging the electrical energy store 186 and reducing the lift provided by the rotor units 116A, 116B by slowing the rotational speed of the first and second sets 165A, 165B of rotor blades of first and second rotor units 116A, 116B. Alternatively, the machines 180, 182 may be configured to operate as electrical generators throughout forward flight in order to charge the electrical energy store 186. Any resulting loss in lift provided by the first and second sets 165A, 165B of rotor blades may be compensated for by increasing the electrical power provided via the controller 185 to the motor 184, thus increasing the forward thrust provided by the dual contra-rotating pusher propeller 115 and increasing the airspeed of the aircraft 100.

To effect vertical landing, the thrust provided by the propeller 115 is reduced by reducing the electrical power provided to the motor 184 via the controller 185, the lift provided by the fore and aft wings 124A, 124B, 119A, 119B thus decreases and the rotor arrangement 165A, 165B, 176A, 176B is again actively driven to provide lift with the first to fourth rotor units 116A, 116B, 118A, 118B in their upright positions, that is, with the rotation axes 192A, 192B, 193A, 193B substantially normal to the horizontal plane 190 of the aircraft 100, the horizontal plane 100 also being parallel to the ground. The propulsor unit 114 ceases operation and the electrical power provided to the electric motors 181, 183 and electrical machines 180, 182 is gradually reduced.

In the passive mode of the rotor blade system, zero net power is required for the rotor blade system. Therefore in the case of failure of the power system 179, the rotor blade system can continue to provide lift almost equal to the aircraft weight, allowing the aircraft 100 to safely descend. In the passive mode of operation of the rotor blade system, air passing through the sets of rotor blades provides the energy required to rotated the sets of rotor blades.

The aircraft 100 is a fully electric aircraft, the electrical power source 186 of the aircraft being an electrical energy store within the power system 179. In a first alternative embodiment, the electrical power source 186 is an electrical power generator, for example a fuel cell or a turbo-electric generator, so that electrical power is generated on board the aircraft rather being stored on the aircraft. Referring to FIG. 8, in a second alternative embodiment the electrical power source 186 is a hybrid arrangement comprising an electrical power generator 187 and an electrical energy store 199 and electrical power may be provided to the controller 185 by the electrical power generator 187 and/or the electrical energy store 199. The electrical energy store 199 may also be charged by the electrical power generator 187. In a first example hybrid arrangement for the electrical power source 186, the electrical power generator 187 is a fuel cell. During the passive mode of operation of the rotor blade system, machines 180, 182 of rotor units 116A, 116B may be configured as electric generators and provide electrical power to the electrical energy store 199 to charge it.

Referring to FIG. 9, in a second example hybrid arrangement, the electrical power generator 187 is a turbo-electric generator comprising an electric generator 191 driven by a shaft 195 of a gas turbine engine 189. FIG. 9 depicts a series-hybrid arrangement in which the gas turbine engine 189 operates only a source of mechanical power driving the electrical generator 191. Again, machines 180, 182, operating as electrical generators in the passive mode of the rotor blade arrangement, provide electrical power to the electrical energy store 199.

FIG. 10 schematically shows a third example hybrid arrangement for the power source 186 in which a shaft 195 of a gas turbine engine 189 may provide mechanical power to electrical generator 191 and to propeller 115 of propulsor unit 114. Motor 184 is mounted on the shaft 195 so that propeller 115 may be driven by gas turbine engine 189, or motor 184 using electrical power from the electrical energy store 199, or both, in a parallel-hybrid arrangement, with motors and machines 180, 181, 182, 183 being powered in a series-hybrid arrangement.

The invention claimed is:

1. A VTOL aircraft comprising:
a pair of fixed wings each wing being located on a respective lateral side of a fuselage of the aircraft, and
a propeller for providing forward thrust when driven by a power system of the aircraft and rotor blade system for providing lift in active and passive modes thereof, the rotor blade system comprising first and second sets of rotor blades, each of which is mounted on a respective one of opposite lateral sides with respect to the fuselage and by a respective fixed wing, wherein
operation of the rotor blade system may be switched between the active mode in which the rotor blade system is driven by a power system of the aircraft and the passive mode in which the rotor blade system is not driven by the power system of the aircraft, the rotor blade system being configurable to provide lift in the passive mode during forward flight of the aircraft,
the first and second sets of rotor blades are comprised in first and second rotor units respectively, each rotor unit being rotatably mounted to a respective fixed wing of the aircraft such that the rotation axis of any given set of the first and second sets of rotor blades may be rotated in a plane which is orthogonal to the horizontal plane of the aircraft and parallel to the central longitudinal axis of the aircraft between a first orientation in which the rotation axis of the set is substantially normal to the horizontal plane of the aircraft and the rotor blade system is in the active mode thereof and a second orientation in which the rotation axis of the set is inclined to the horizontal plane of the aircraft and the rotor blade system is in the passive mode thereof, and
the first and second rotor units each comprise a respective rudder for influencing yaw of the aircraft.

2. A VTOL aircraft according to claim 1 wherein each of the first and second sets of rotor blades comprises respective first and second sub-sets of rotor blades, the sub-sets of a given set being arranged for rotation about a common rotation axis and mutually displaced along said axis.

3. A VTOL aircraft according to claim 1 further comprising a second pair of fixed wings each of which is located on a respective lateral side of the aircraft, the second pair of fixed wings being located forward of the pair of fixed wings.

4. A VTOL aircraft according to claim 3 wherein the rotor blade system further comprises third and fourth sets of rotor blades, each of which is mounted by a respective fixed wing of the second pair of fixed wings.

5. A VTOL aircraft according to claim 4 wherein the third and fourth sets of rotor blades are comprised in third and fourth rotor units respectively, each of the third and fourth rotor units being mounted to a respective fixed wing of the second pair of fixed wings such that the rotation axis of any given set of the third and fourth sets of rotor blades may be rotated in a plane which is orthogonal to the horizontal plane of the aircraft and parallel to the central longitudinal axis of the aircraft between a first orientation in which the rotation axis of the set is substantially normal to the horizontal plane of the aircraft and the rotor blade system is in the active mode thereof and a second orientation in which the rotation axis of the set is inclined to the horizontal plane of the aircraft and the rotor blade system is in the passive mode thereof.

6. A VTOL aircraft according to claim 5 wherein the third and fourth rotor units each comprise a respective rudder for influencing the yaw of the aircraft.

7. A VTOL aircraft according to claim 1 wherein at least part of the rotor blade system may be arranged to drive an electrical generator or an electrical machine configured as an electrical generator during the passive mode of operation of the rotor blade system.

8. A VTOL aircraft according to claim 1 wherein the power system comprises an electric motor or an electrical machine configurable as an electric motor and an electrical power source and wherein in the active mode the electric motor or the electrical machine configured an electric motor is arranged to receive electrical power from the electrical power source and to drive at least part of the rotor blade system.

9. A VTOL aircraft according to claim 8 wherein the electrical power source is an electrical power generator.

10. A VTOL aircraft according to claim 8 wherein the electrical power source is an electrical energy store.

11. A VTOL aircraft according to claim 8 wherein the electrical power source comprises an electrical power generator and an electrical energy store and wherein the power system is configurable such that (i) the electric motor or the electrical machine configured as an electric motor may receive electrical power from the electrical power generator or the electrical energy store or both the electrical power generator and the electrical energy store, and (ii) the electrical energy store receives electrical power from the electrical power generator.

12. A VTOL aircraft according to claim 11 wherein the power system comprises an electric motor arranged to receive electrical power from the electrical power generator, the electrical energy store or both the electrical power generator and the electrical energy store and to provide mechanical power to the propeller.

13. A VTOL aircraft according to claim 12 wherein the electrical power source comprises an electrical generator and a gas turbine engine arranged to drive the electrical generator.

14. A VTOL aircraft according to claim 13 wherein a shaft of the gas turbine engine is mechanically coupled to or integral with a shaft of the electric motor which is arranged to provide mechanical power to the propeller.

15. A VTOL aircraft according to claim 10 wherein the electric motor or the electrical machine configured as an electric motor is an electrical machine and is configurable in the passive mode as an electrical generator which is arranged to provide electrical power to the electrical energy store.

16. A VTOL aircraft comprising:
a first pair of fixed wings each wing being located on a respective lateral side of the aircraft;
a propeller for providing forward thrust when driven by a power system of the aircraft and rotor blade system for providing lift in active and passive modes thereof, the rotor blade system comprising first and second sets of rotor blades, each of which is mounted by a respective fixed wing, wherein operation of the rotor blade system may be switched between the active mode in which the rotor blade system is driven by a power system of the aircraft and the passive mode in which the rotor blade system is not driven by the power system of the aircraft, the rotor blade system being configurable to provide lift in the passive mode during forward flight of the aircraft; and a second pair of fixed wings each of which is located on a respective lateral side of the aircraft, the second pair of fixed wings being located forward of the first pair of fixed wings; wherein the rotor blade system further comprises third and fourth sets of rotor blades, each of which is mounted by a respective fixed wing of the second pair of fixed wings, the third and fourth sets of rotor blades are in third and fourth rotor units respectively, each of the third and fourth rotor units being mounted to a respective fixed wing of the second pair of fixed wings such that the rotation axis of any given set of the third and fourth sets of rotor blades may be rotated in a plane which is orthogonal to the horizontal plane of the aircraft and parallel to the central longitudinal axis of the aircraft between a first orientation in which the rotation axis of the set is substantially normal to the horizontal plane of the aircraft and the rotor blade system is in the active mode thereof and a second orientation in which the rotation axis of the set is inclined to the horizontal plane of the aircraft and the rotor blade system is in the passive mode thereof, and the third and fourth rotor units each comprise a respective rudder for influencing yaw of the aircraft.

* * * * *